US009852485B2

(12) United States Patent
Wang et al.

(10) Patent No.: US 9,852,485 B2
(45) Date of Patent: Dec. 26, 2017

(54) SYSTEMS AND METHODS FOR POWER TOPOLOGY MAPPING

(71) Applicant: Dell Products L.P., Round Rock, TX (US)

(72) Inventors: Lei Wang, Austin, TX (US); Mehran Mirjafari, Austin, TX (US); John J. Breen, Harker Heights, TX (US); Ralph H. Johnson, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 14/667,287

(22) Filed: Mar. 24, 2015

(65) Prior Publication Data

US 2016/0282823 A1 Sep. 29, 2016

(51) Int. Cl.
*G05B 15/02* (2006.01)
*G06Q 50/06* (2012.01)

(52) U.S. Cl.
CPC .................................... *G06Q 50/06* (2013.01)

(58) Field of Classification Search
CPC ..................................................... G06Q 50/06
USPC .......................................................... 700/296
See application file for complete search history.

(56) References Cited

U.S. PATENT DOCUMENTS

| | | | | |
|---|---|---|---|---|
| 8,726,045 | B2 * | 5/2014 | Goodrum | H04L 12/10 700/297 |
| 2009/0307515 | A1 * | 12/2009 | Bandholz | G06F 1/26 713/340 |
| 2011/0051476 | A1 * | 3/2011 | Manor | H02M 1/14 363/65 |
| 2015/0023077 | A1 * | 1/2015 | Earanky | H02M 1/4208 363/89 |

* cited by examiner

*Primary Examiner* — Ziaul Karim
*Assistant Examiner* — Joshua Sanders
(74) *Attorney, Agent, or Firm* — Jackson Walker L.L.P.

(57) ABSTRACT

In accordance with embodiments of the present disclosure, a method may include communicating a first message to an information handling system such that receipt of the first message by the information handling system causes the information handling system to cause a power supply unit integral to the information handling system to experience a perturbation in an electrical current associated with the power supply unit and receiving a second message from a power distribution unit via an outlet integral to the power distribution unit, the second message indicative of a response to the perturbation of a measured electrical parameter of the outlet.

12 Claims, 5 Drawing Sheets

SYSTEMS AND METHODS FOR POWER TOPOLOGY MAPPING

TECHNICAL FIELD

The present disclosure relates in general to information handling systems, and more particularly to systems and methods for mapping power topology in a data center environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a data center comprising multiple information handling systems, there is often a desire to gather configuration and status information, and create maps from this information to define a complete power and information technology equipment infrastructure or topology of the data center. Having a map of such topology may assist in data center management, allowing removal of guess work in determining a data center's power needs, reclamation of trapped power, and avoiding unscheduled downtime.

Such configuration and status information may include at least two types of data. One type of data is data regarding individual information handling system hardware configuration, such as computing load and power consumption, etc. which may be used to optimize system resource mapping. Another type of data is a physical power mapping between one or more power distribution units and individual power supply units, which may be used for balancing loads on each alternating current phase in order to optimize power sourcing. Existing approaches to such mapping typically involve manual entry of mapping the server rack location and its corresponding power distribution unit and power distribution outlet in a table or other data structure. Such manual data entry may be costly, time consuming, and prone to error.

SUMMARY

In accordance with the teachings of the present disclosure, the disadvantages and problems associated with mapping of a power topology may be reduced or eliminated.

In accordance with embodiments of the present disclosure, an information handling system may include a processor and a non-transitory computer-readable medium communicatively coupled to the processor and having stored thereon a program of instructions. The instructions for may cause the processor to, when read and executed, communicate a first message to a second information handling system such that receipt of the first message by the second information handling system causes the second information handling system to cause a power supply unit integral to the second information handling system to experience a perturbation in an electrical current associated with the power supply unit and receive a second message from a power distribution unit via an outlet integral to the power distribution unit, the second message indicative of a response to the perturbation of a measured electrical parameter of the outlet.

In accordance with these and other embodiments of the present disclosure, a method may include communicating a first message to an information handling system such that receipt of the first message by the information handling system causes the information handling system to cause a power supply unit integral to the information handling system to experience a perturbation in an electrical current associated with the power supply unit and receiving a second message from a power distribution unit via an outlet integral to the power distribution unit, the second message indicative of a response to the perturbation of a measured electrical parameter of the outlet.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to communicate a first message to a second information handling system such that receipt of the first message by the second information handling system causes the second information handling system to cause a power supply unit integral to the second information handling system to experience a perturbation in an electrical current associated with the power supply unit and receive a second message from a power distribution unit via an outlet integral to the power distribution unit, the second message indicative of a response to the perturbation of a measured electrical parameter of the outlet.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-9, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
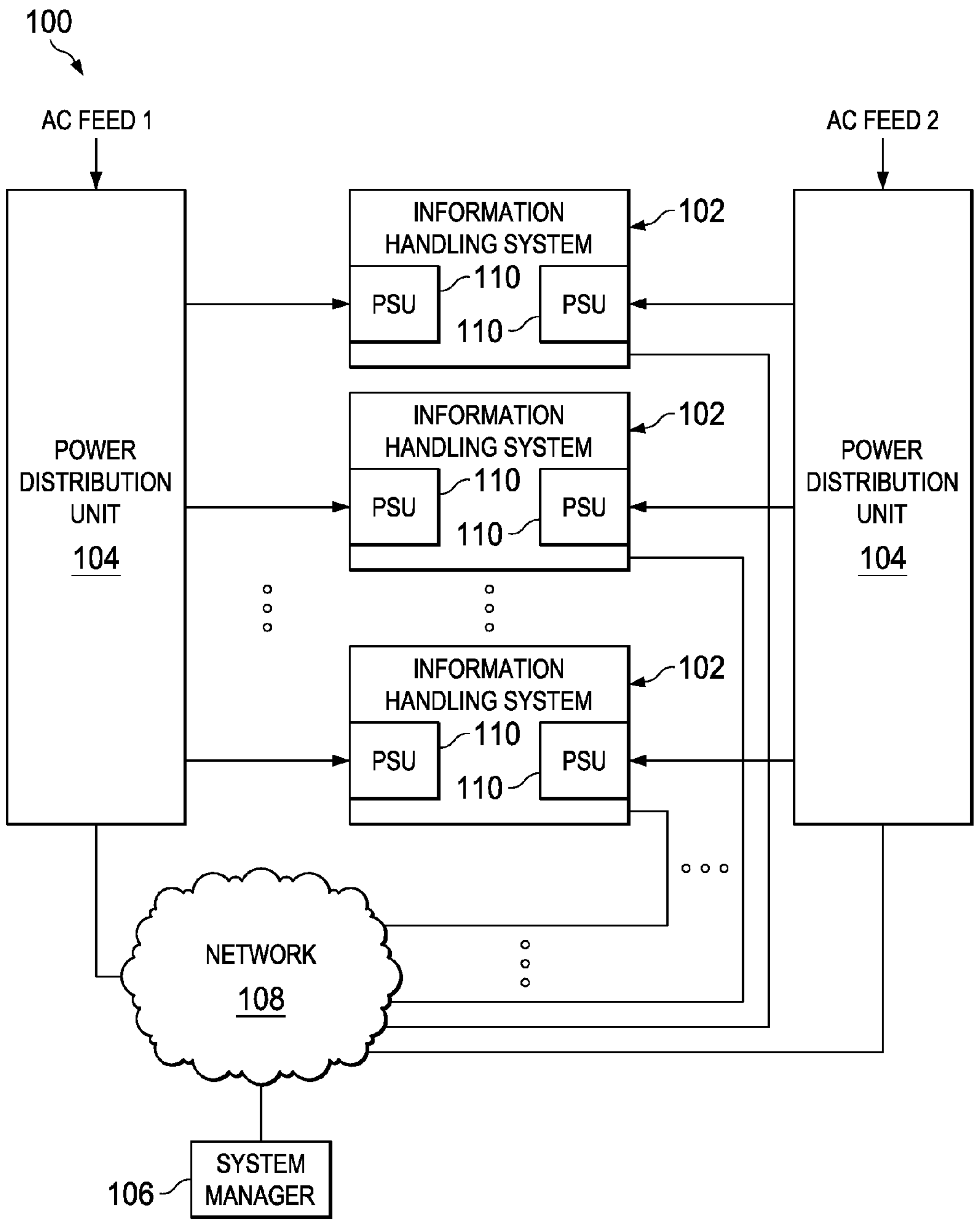
FIG. 1 illustrates a block diagram of an example system, in accordance with embodiments of the present disclosure.

FIG. 1 illustrates a block diagram of an example system 100 which may represent at least a portion of components present in a data center environment. As shown in FIG. 1, system 100 may comprise a plurality of information handling systems 102, one or more power distribution units 104, a system manager 106, and a network 108 communicatively coupled to the information handling systems 102, power distribution units 104, and system manager 106.

In some embodiments, each information handling system 102 may comprise a server. As shown in FIG. 1, each information handling system 102 may include at least one power supply unit (PSU) 110 configured to receive electrical energy from a corresponding power outlet of power distribution unit 104 in order to provide power to components of information handling system 102. Although FIG. 1 depicts each information handling system 102 having two PSUs 110, an information handling system 102 may include any suitable number of PSUs 110 each of which may be supplied electrical energy from a corresponding outlet of a power distribution unit 104.

Although FIG. 1 depicts system 100 having two power distribution units 104, system 100 may include any suitable number of power distribution units 104. In embodiments including a plurality of power distribution units 104, some power distribution units 104 may receive a different alternating current source as shown by "AC FEED 1" and "AC FEED 2" in FIG. 1.

Also as shown in FIG. 1, a system manager 106 for monitoring, control, and management of power distribution units 104 and information handling systems 102 may be coupled via network 108 to power distribution units 104 and information handling systems 102 (e.g., via Ethernet).

Network 108 may be a network and/or fabric configured to couple system manager 106 to information handling systems 102, power distribution units 104, and/or one or more other information handling systems. In these and other embodiments, network 108 may include a communication infrastructure, which provides physical connections, and a management layer, which organizes the physical connections and information handling systems communicatively coupled to network 108. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 108 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, software, or any combination thereof.

Figure 2:
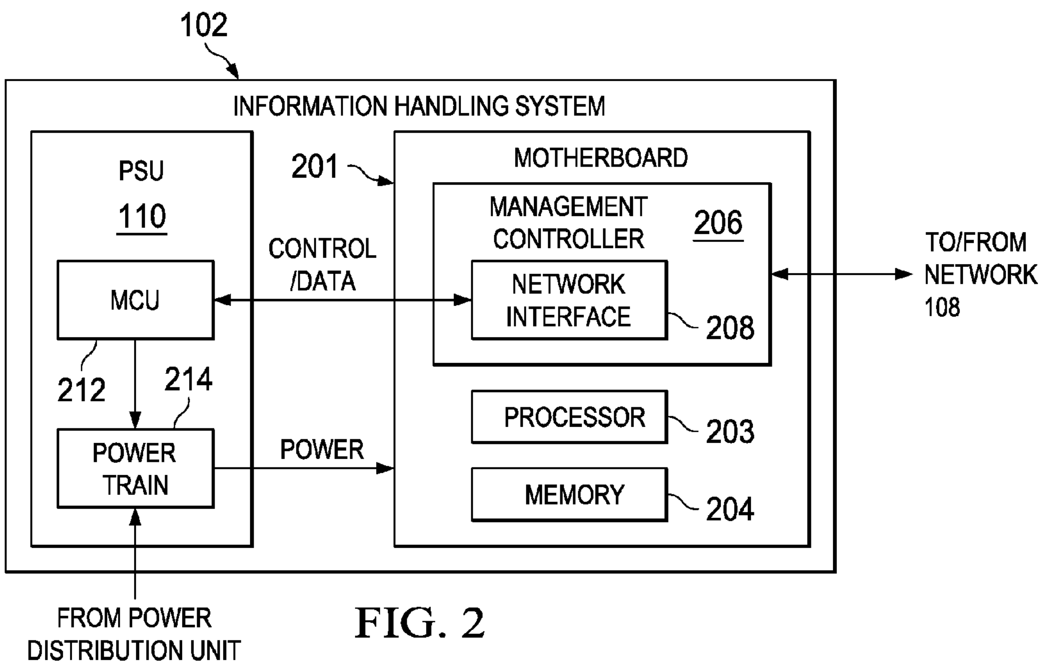
FIG. 2 illustrates a block diagram of an example information handling system, in accordance with embodiments of the present disclosure.

FIG. 2 illustrates a block diagram of an example of an information handling system 102. As depicted, information handling system 102 may include PSU 110, a motherboard 201, and one or more other information handling resources.

Motherboard 201 may include a circuit board configured to provide structural support for one or more information handling resources of information handling system 102 and/or electrically couple one or more of such information handling resources to each other and/or to other electric or electronic components external to information handling system 102. As shown in FIG. 2, motherboard 201 may include a processor 203, memory 204, a management controller 206, and one or more other information handling resources.

Processor 203 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204 and/or another component of information handling system 102. Memory 204 may be communicatively coupled to processor 203 and may comprise any system, device, or apparatus operable to retain program instructions or data for a period of time. Memory 204 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Management controller 206 may be configured to provide out-of-band management facilities for management of information handling system 102. Such management may be made by management controller 206 even if information handling system 102 is powered off or powered to a standby state. Management controller 206 may include a processor, memory, out-of-band network interface 208 separate from and physically isolated from an in-band network interface of information handling system 102, and/or other embedded information handling resources. In certain embodiments, management controller 206 may include or may be an integral part of a baseboard management controller (BMC) or a remote access controller (e.g., a Dell Remote Access Controller or Integrated Dell Remote Access Controller). In other embodiments, management controller 206 may include or may be an integral part of a chassis management controller (CMC). In some embodiments, management controller 206 may be configured to communicate with PSU 110 to communicate control and/or telemetry data between the two.

Network interface 208 may comprise any suitable system, apparatus, or device operable to serve as an interface between management controller 206 and another information handling system (e.g., system manager 106) and/or a network (e.g., network 108). Network interface 208 may enable management controller 206 to communicate using any suitable transmission protocol and/or standard. In some embodiments, network interface 206 may be configured to communicate with other information handling systems via one or more protocols or standards discussed above with respect to network 108. In these and other embodiments, network interface 208 may comprise a network interface card, or "NIC."

Generally speaking, PSU 110 may include any system, device, or apparatus configured to supply electrical current to one or more information handling resources of information handling system 102. As shown in FIG. 2, PSU 110 may include one or more microcontroller units (MCUs) 212 and a power train 214. An MCU 212 may comprise a microprocessor, DSP, ASIC, FPGA, EEPROM, or any combination thereof, or any other device, system, or apparatus for controlling operation of its associated PSU 110. As such, an MCU 212 may comprise firmware, logic, and/or data for controlling functionality of such PSU 110. Power train 214 may include any suitable system, device, or apparatus for converting electrical energy received from power distribution unit 104 (e.g., a 120-volt alternating current voltage waveform) into electrical energy usable to information handling resources of information handling system 102 (e.g., 12-volt direct current voltage source). Selected components of an example power train 214 are shown in FIG. 3 below.

In addition to motherboard 201, processor 203, memory 204, management controller 206, network interface 208, and PSU 110, information handling system 102 may include one or more other information handling resources.

Figure 3:
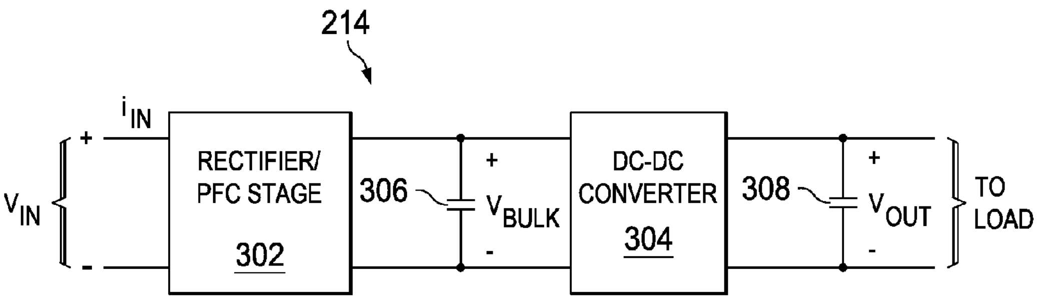
FIG. 3 illustrates a block diagram of an example power train, in accordance with embodiments of the present disclosure.

FIG. 3 illustrates a block diagram of an example power train 214, in accordance with embodiments of the present disclosure. As shown in FIG. 3, power train 214 may include two converter stages: a power factor correction stage 302, a DC/DC converter stage 304, a bulk capacitor 306 coupled between an output of power factor correction stage 302 and an input of DC/DC converter stage 304 and an output capacitor 308 coupled to an output of DC/DC converter stage 304.

Rectifier/PFC stage 302 may be configured to, based on an input current $i_{IN}$, a sinusoidal voltage source $v_{IN}$, and a bulk capacitor voltage $V_{BULK}$, shape the input current $i_{IN}$ to have a sinusoidal waveform in-phase with the source voltage $v_{IN}$ and to generate regulated DC bus voltage $V_{BULK}$ on bulk capacitor 306.

DC/DC converter stage 304 may convert bulk capacitor voltage $V_{BULK}$ to a DC output voltage $V_{OUT}$ on output capacitor 308 which may be provided to a load (e.g., to information handling resources of information handling system 102 in order to power such information handling resources). In some embodiments, DC/DC converter stage 304 may be implemented as a converter which converts a higher DC voltage (e.g., 400 V) into a lower DC voltage (e.g., 12 V).

Figure 4:
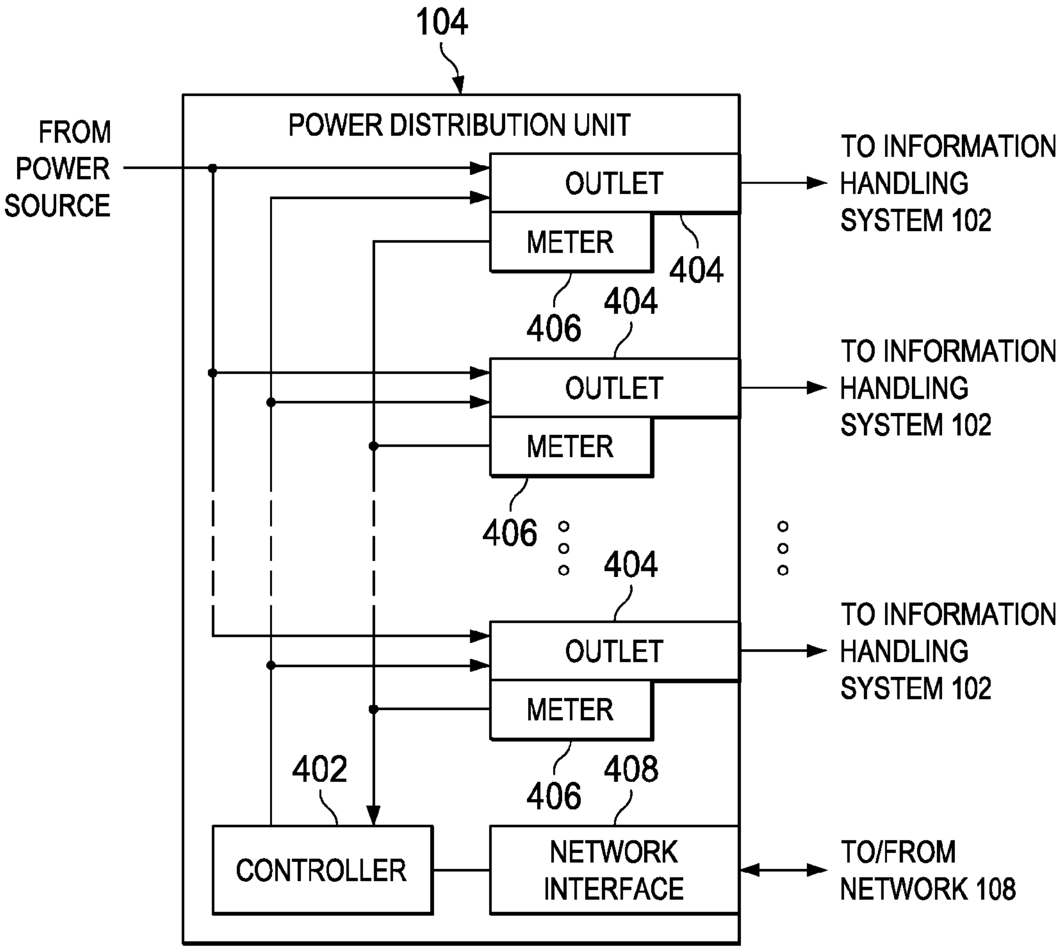
FIG. 4 illustrates a block diagram of an example power distribution unit, in accordance with embodiments of the present disclosure.

FIG. 4 illustrates a block diagram of an example power distribution unit 104, in accordance with embodiments of the present disclosure. As shown in FIG. 4, power distribution unit 104 may be an "intelligent" power distribution unit 104 comprising a controller 402, a plurality of outlets 404, a plurality of meters 406, and a network interface 408.

Controller 402 may comprise any system, device, or apparatus operable to monitor and/or control operation of power distribution unit 104, including control of operation of outlets 404 and the distribution of power thereto, and the reading and/or processing of information from meters 406. Controller 402 may include, without limitation a microprocessor, microcontroller, digital signal processor (DSP), application specific integrated circuit (ASIC), or any other digital or analog circuitry configured to interpret and/or execute program instructions and/or process data. In some embodiments, controller 402 may interpret and/or execute program instructions (e.g., firmware) and/or process data stored in computer-readable media accessible to controller 402. In operation, power distribution unit 104 may distribute electrical energy received from a power source (e.g., a nominally 60 Hz/110 V line voltage in the United States of America or a nominally 50 Hz/220 V line voltage in Europe) to one or more outlets 404. Each outlet 404 may comprise a suitable electrical connector (e.g., a female electrical connector) for receiving a plug or other male connector of a device (e.g., a PSU 110 of an information handling system 102) in order to deliver electrical energy to such device.

Each meter 406 may be associated with a corresponding outlet 404 (e.g., in a one-to-one correspondence) and may include any system, device, or apparatus configured to meter one or more parameters (e.g., voltage, current, etc.) indicative of electrical energy delivered from the corresponding outlet 404.

Network interface 408 may comprise any suitable system, apparatus, or device operable to serve as an interface between power distribution unit 104 and an information handling system (e.g., system manager 106) and/or a network (e.g., network 108). Network interface 408 may enable power distribution unit 104 to communicate using any suitable transmission protocol and/or standard. In some embodiments, power distribution unit 104 may be configured to communicate with other information handling systems (including without limitation system manager 106) via one or more protocols or standards discussed above with respect to network 108. In these and other embodiments, network interface 408 may comprise a NIC.

Figure 5:
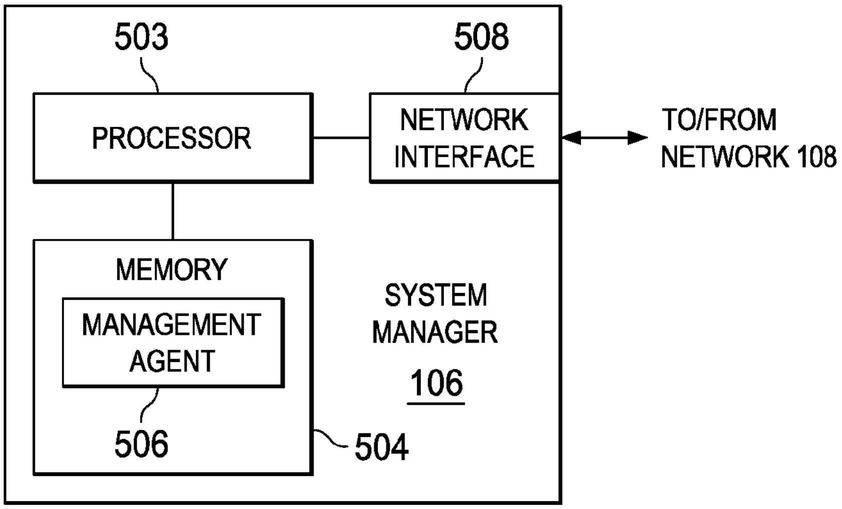
FIG. 5 illustrates a block diagram of an example system manager, in accordance with embodiments of the present disclosure.

FIG. 5 illustrates a block diagram of an example system manager 106, in accordance with embodiments of the present disclosure. Also described above, system manager 106 may be configured to monitor, control, and manage power distribution unit 104 and information handling systems 102. In some embodiments, system manager 106 may comprise a server. In other embodiments, system manager 106 may comprise a personal computer, such as a laptop, notebook, or desktop computer. In yet other embodiments, system manager 106 may be a mobile device sized and shaped to be readily transported and carried on a person of a user of information handling system 102 (e.g., a smart phone, a tablet computing device, a handheld computing device, a personal digital assistant, etc.). As shown in FIG. 5, system manager 106 may comprise a processor 503, a memory 504, and a network interface 508.

Processor 503 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 503 may interpret and/or execute program instructions and/or process data stored in memory 504 and/or another component of system manager 106. Memory 504 may be communicatively coupled to processor 503 and may comprise any system, device, or apparatus operable to retain program instructions or data for a period of time. Memory 504 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to system manager 106 is turned off. As shown in FIG. 5, memory 504 may have stored thereon a management agent 506. Management agent 506 may include a program of instructions that may be read and executed by processor 503 in order to carry out the management functionality of system manager 106, as such functionality is described elsewhere in this disclosure.

Network interface 508 may comprise any suitable system, apparatus, or device operable to serve as an interface between system manager 106 and one or more information handling systems (e.g., information handling systems 102), other networked devices (e.g., power distribution unit 104) and/or a network (e.g., network 108). Network interface 508 may enable system manager 106 to communicate using any suitable transmission protocol and/or standard. In some embodiments, system manager 106 may be configured to communicate with other information handling systems via one or more protocols or standards discussed above with respect to network 108. In these and other embodiments, network interface 508 may comprise a NIC.

In operation, system manager 106 may deliver a signal to an information handling system 102. In response to the signal, the information handling system 102 may cause one of its PSUs 110 to perturb a current drawn by the PSU 110 for a brief period of time. A meter 406 of power distribution unit 104 may detect the perturbation, and the power distribution unit 104 may communicate a signal to the system manager 106 indicative of the current. Based on the perturbation and the response of power distribution unit 104 thereto, system manager 106 may then determine a mapping between the PSU 110 and the outlet 404 to which it is coupled. This process may then be repeated for each PSU 110 of system 100.

Figure 6:
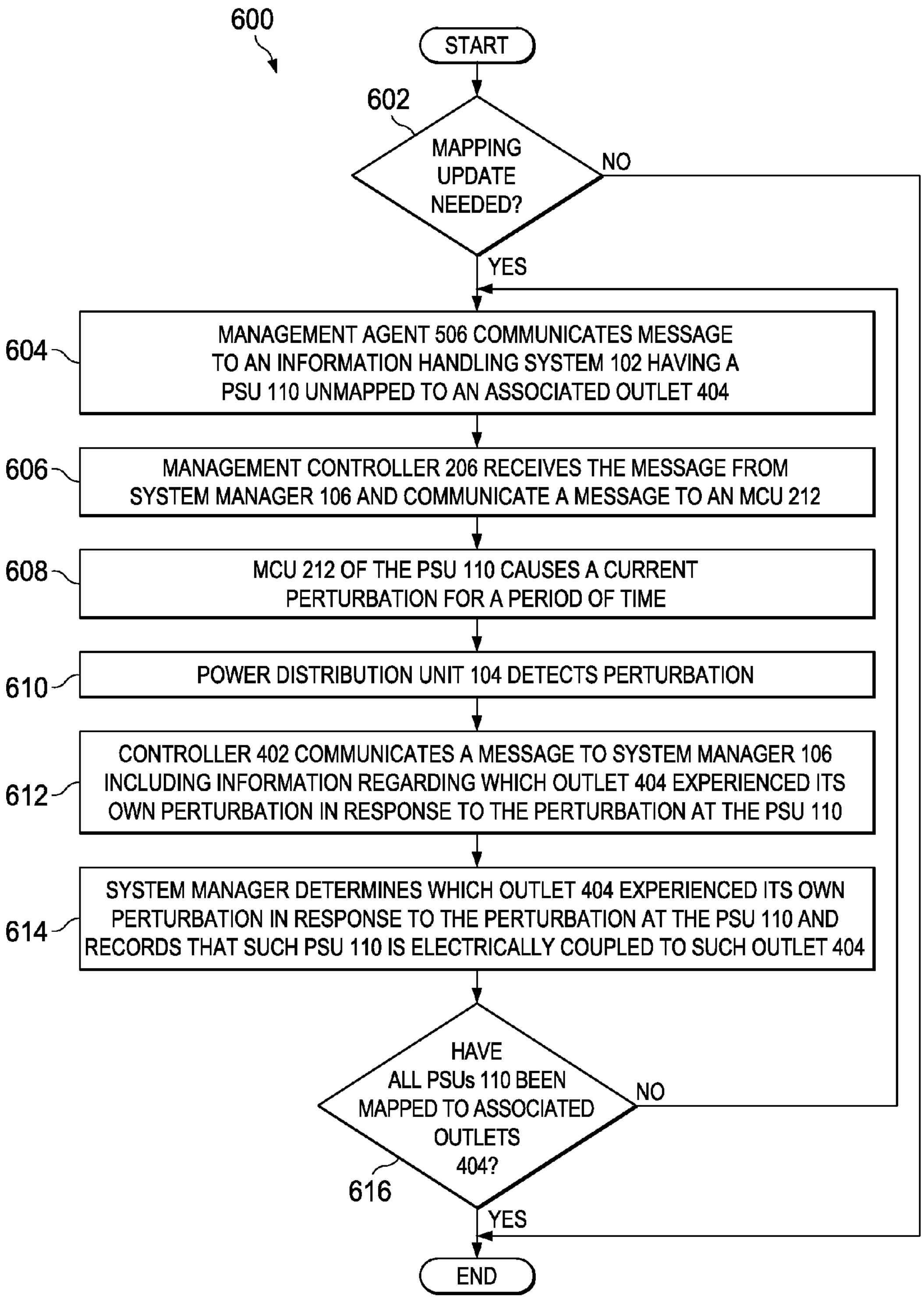
FIG. 6 illustrates a flow chart of an example method for mapping a power supply unit to a power distribution unit and outlet, in accordance with embodiments of the present disclosure.

FIG. 6 illustrates a flow chart of an example method 600 for mapping PSUs 110 to power distribution units 104 and outlets 404 thereof, in accordance with embodiments of the present disclosure. According to certain embodiments, method 600 may begin at step 602. As noted above, teachings of the present disclosure may be implemented in a variety of configurations of system 100. As such, the preferred initialization point for method 600 and the order of the steps comprising method 600 may depend on the implementation chosen.

At step 602, management agent 506 may determine if an update of mapping between PSUs 110 and power distribution units 104 and outlets 404 thereof is needed. An update may be needed for many reasons, including without limitation, a policy to periodically (e.g., monthly) update mapping, a user request to perform an update, and/or other suitable reasons. For example, a user may desire to request an update in response to making a change to the power topology of system 100 (e.g., replacement of PSU 110, replacement of power cord, relocation of an information handling system 102, etc.). If an update is needed, method 600 may proceed to step 604, and management agent may authorize a process to map all information handling systems 102 of system 100 to their corresponding power distribution units 104 and outlets 404, and management agent 506 may store a map indicative of the power topology. Otherwise, method 600 may end.

At step 604, management agent 506 may communicate (e.g., via network 108) a message to an information handling system 102. In some embodiments, such message may comprise one or more datagrams (e.g., packets) communicated via Ethernet.

At step 606, management controller 206 of an information handling system 102 may receive the message from system manager 106 and, in response, may communicate a message to an MCU 212 of an unmapped PSU 110, wherein the message requests that the PSU 110 cause a current perturbation. At step 608, in response to the message from management controller 206, MCU 212 of the PSU 110 may cause a current perturbation for a period of time. Examples of such current perturbations are described in greater detail below in references to FIGS. 7-9.

At step 610, a meter 406 metering an outlet 404 to which the PSU 110 is electrically coupled may, in the course of its normal metering of such outlet 404, detect such perturbation of the current of the PSU 110. At step 612, as part of its normal communication of meter data to system manager 106 or in response to a request from system manager 106 to communicate such meter data, controller 402 may communicate a message to system manager 106 which may include information regarding which outlet 404 experienced its own perturbation in response to the perturbation at the PSU 110.

At step 614, system manager 106 may receive the meter data from power distribution unit 104 and determine from such data which outlet 404 experienced its own perturbation in response to the perturbation at the PSU 110. Based on such determination, system manager 106 may, in its configuration data, record (e.g., in memory 504 or another computer-readable medium accessible to processor 503) that the PSU 110 is electrically coupled to such outlet 404.

At step 616, management agent 506 may determine if all PSUs 110 of information handling systems 102 of system 100 have each been mapped to an associated outlet 404 of a power distribution unit 104 to which each PSU 110 is electrically coupled. If all PSUs 110 have been so mapped, method 600 may end. Otherwise, method 600 may proceed again to step 604, and steps 604 through 614 may repeat for each PSU 110 of system 100.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using system 100, components thereof or any other system operable to implement method 600. In certain embodiments, method 600 may be implemented partially or fully in software and/or firmware embodied in computer-readable media.

Figure 7:
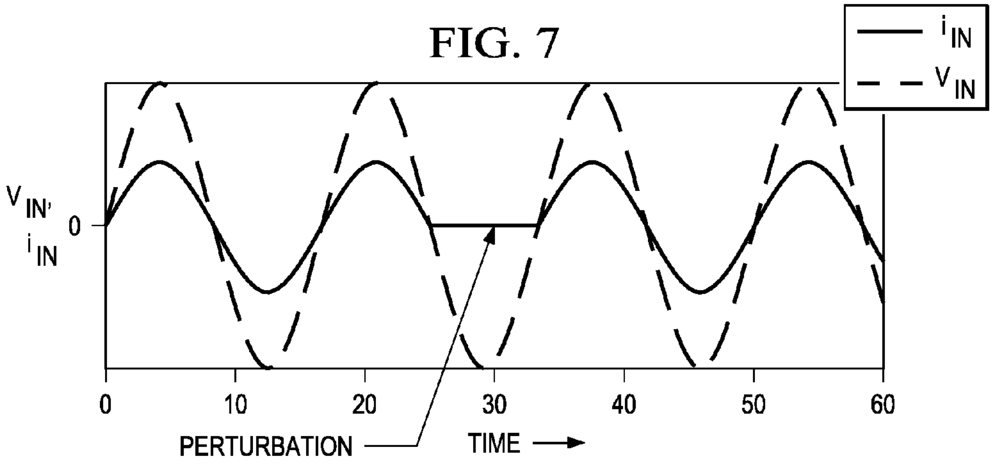
FIG. 7 illustrates a graph depicting an example current perturbation that may be applied to a power supply unit in order to facilitate mapping of the power supply unit to an outlet of a power distribution unit, in accordance with embodiments of the present disclosure.

FIG. 7 illustrates a graph depicting an example current perturbation that may be applied to a PSU 110 in order to facilitate mapping of the PSU 110 to an outlet 404 of a power distribution unit 104, in accordance with embodiments of the present disclosure. Such perturbation may be applied, for example, at step 608 of method 600. In the embodiments represented by FIG. 7, PSU 110 may, in response to a message received at its MCU 212 to perturb its current, disable power factor correction stage 302 of its power train 214 for a short period of time (e.g., one half-line cycle). In some of such embodiments, the disabling of power factor correction stage 302 may be less than a hold-up time of the PSU 110, such that power factor correction stage 302 may be disabled without affecting the voltage $V_{OUT}$ output by power train 214. During such disabling of power factor correction stage 302, the input current $i_{IN}$ to power factor correction stage 302 may be forced to zero, as shown in FIG. 7. This brief zeroing of current may be detected by a meter 406, with such detection communicated to system manager 106 as described above, allowing system manager 106 to determine that the PSU 110 having the disturbance is electrically coupled to a specific outlet 404 of power distribution unit 104.

Figure 8:
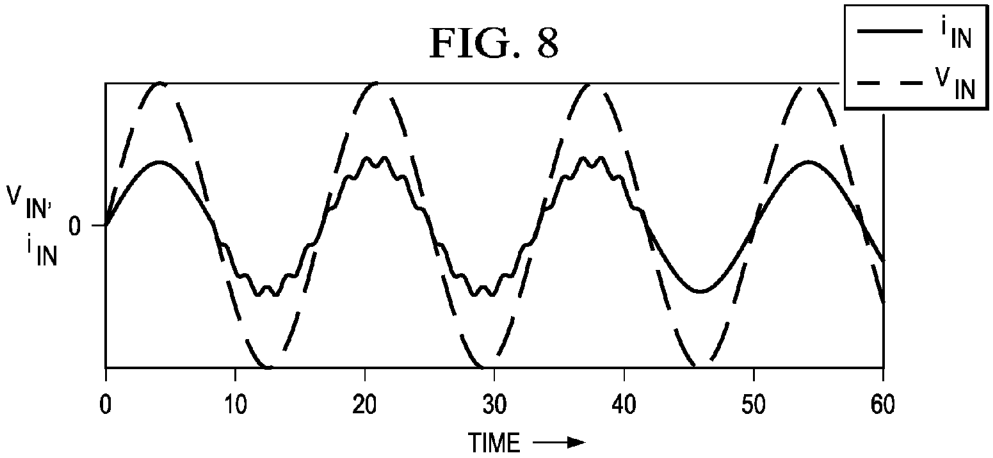
FIG. 8 illustrates a graph depicting another example current perturbation that may be applied to a power supply unit in order to facilitate mapping of the power supply unit to an outlet of a power distribution unit, in accordance with embodiments of the present disclosure.

FIG. 8 illustrates a graph depicting an example current perturbation that may be applied to a PSU 110 in order to facilitate mapping of the PSU 110 to an outlet 404 of a power distribution unit 104, in accordance with embodiments of the present disclosure. Such perturbation may be applied, for example, at step 608 of method 600. In the embodiments represented by FIG. 8, PSU 110 may, in response to a message received at its MCU 212 to perturb its current, inject harmonics into input current $i_{IN}$. For example, FIG. 8 depicts $11^{th}$-order harmonics being injected into input current $i_{IN}$. Power factor correction stage 302 may respond to the injected current by increasing the total harmonic distortion of input current $i_{IN}$. Such hike in total harmonic distortion may be detected by a meter 406, with such detection communicated to system manager 106 as described above, allowing system manager 106 to determine that the PSU 110 having the disturbance is electrically coupled to a specific outlet 404 of power distribution unit 104.

Figure 9:
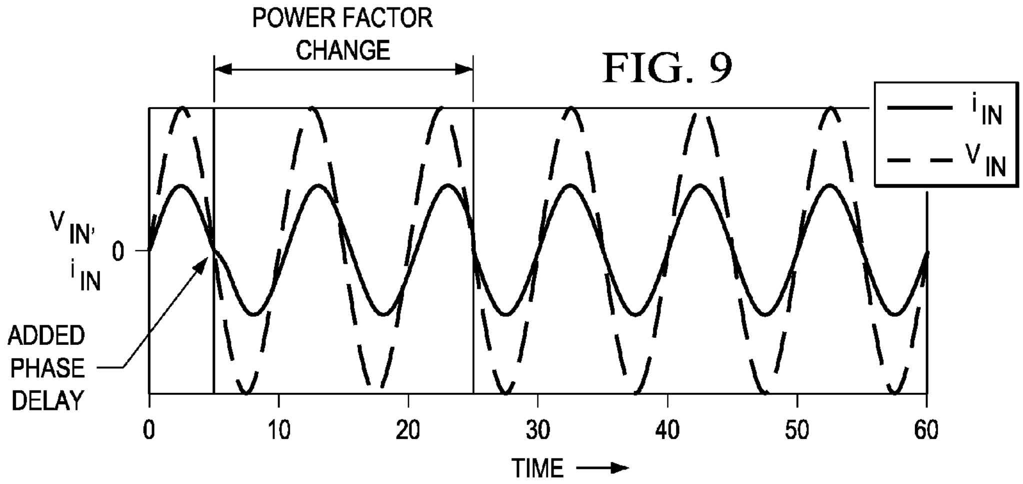
FIG. 9 illustrates a graph depicting another example current perturbation that may be applied to a power supply unit in order to facilitate mapping of the power supply unit to an outlet of a power distribution unit, in accordance with embodiments of the present disclosure.

FIG. 9 illustrates a graph depicting an example current perturbation that may be applied to a PSU 110 in order to facilitate mapping of the PSU 110 to an outlet 404 of a power distribution unit 104, in accordance with embodiments of the present disclosure. Such perturbation may be applied, for example, at step 608 of method 600. In the embodiments represented by FIG. 9, PSU 110 may, in response to a message received at its MCU 212 to perturb its current, introduce a phase delay to input current $i_{IN}$. In response to input current $i_{IN}$ and source voltage $v_{IN}$ becoming out of phase, the power factor of the PSU 110 may decrease for a period of time, until the phase delay is corrected by power factor correction stage 302. Such decrease in power factor may be detected by a meter 406, with such detection communicated to system manager 106 as described above, allowing system manager 106 to determine that the PSU 110 having the disturbance is electrically coupled to a specific outlet 404 of power distribution unit 104.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:

a processor;

a non-transitory computer-readable medium communicatively coupled to the processor and having stored thereon a program of instructions, the instructions for causing the processor to, when read and executed:

communicate a first message to a second information handling system such that receipt of the first message by the second information handling system causes the second information handling system to cause a power supply unit integral to the second information handling system to experience a perturbation in an electrical current associated with the power supply unit, wherein the perturbation comprises a disabling, for a time period less than a hold-up time of the power supply unit, of a power factor correction stage of a power train integral to the power supply unit; and receive a second message from a power distribution unit via an outlet integral to the power distribution unit, the second message indicative of a response to the perturbation of a measured electrical parameter of the outlet.

2. The information handling system of claim 1, the instructions for further causing the processor to determine that the power supply unit is electrically coupled to the outlet based on the second message.

3. The information handling system of claim 1, the instructions for further causing the processor to, responsive to the second message, record an indication that the power supply unit is electrically coupled to the outlet.

4. The information handling system of claim 3, the instructions for further causing the processor to construct a mapping of individual power supply units including the power supply unit to respective individual power distribution unit outlets comprising the outlet.

5. A method comprising:

communicating a first message to an information handling system such that receipt of the first message by the information handling system causes the information handling system to cause a power supply unit integral to the information handling system to experience a perturbation in an electrical current associated with the power supply unit, wherein the perturbation comprises a disabling, for a time period less than a hold-up time of the power supply unit, of a power factor correction stage of a power train integral to the power supply unit; and receiving a second message from a power distribution unit via an outlet integral to the power distribution unit, the second message indicative of a response to the perturbation of a measured electrical parameter of the outlet.

6. The method of claim 5, further comprising determining that the power supply unit is electrically coupled to the outlet based on the second message.

7. The method of claim 5, further comprising, responsive to the second message, recording an indication that the power supply unit is electrically coupled to the outlet.

8. The method of claim 7, further comprising constructing a mapping of individual power supply units including the power supply unit to respective individual power distribution unit outlets comprising the outlet.

9. An article of manufacture comprising:

a non-transitory computer-readable medium; and computer-executable instructions carried on the computer-readable medium, the instructions readable by a processor, the instructions, when read and executed, for causing the processor to:

communicate a first message to a second information handling system such that receipt of the first message by the second information handling system causes the second information handling system to cause a power supply unit integral to the second information handling system to experience a perturbation in an electrical current associated with the power supply unit, wherein the perturbation comprises a disabling, for a time period less than a hold-up time of the power supply unit, of a power factor correction stage of a power train integral to the power supply unit; and receive a second message from a power distribution unit via an outlet integral to the power distribution unit, the second message indicative of a response to the perturbation of a measured electrical parameter of the outlet.

10. The article of claim 9, the instructions for further causing the processor to determine that the power supply unit is electrically coupled to the outlet based on the second message.

11. The article of claim 9, the instructions for further causing the processor to, responsive to the second message, record an indication that the power supply unit is electrically coupled to the outlet.

12. The article of claim 11, the instructions for further causing the processor to construct a mapping of individual power supply units including the power supply unit to respective individual power distribution unit outlets comprising the outlet.

* * * * *